United States Patent [19]

Uchida et al.

[11] Patent Number: 4,759,933

[45] Date of Patent: Jul. 26, 1988

[54] METHOD FOR PRODUCTION OF PROTEIN FOOD PRODUCTS OR PROTEIN FOOD MATERIALS IN PASTE STATE AND METHOD FOR THE PRODUCTION OF FOOD PRODUCTS FROM THESE MATERIALS

[75] Inventors: Yasuzo Uchida, 2-4, 4-chome, Kanamachi Katsushika-Ku, Tokyo; Yasuo Iso, Tokyo; Hiroki Saeki, Tokyo; Hitoshi Nagasaki, Tokyo; Makoto Itoh, Tokyo, all of Japan

[73] Assignees: Taiyo Fishery Co., Ltd.; Yasuzo Uchida, both of Tokyo, Japan

[21] Appl. No.: 892,748

[22] Filed: Aug. 4, 1986

Related U.S. Application Data

[63] Continuation of Ser. No. 504,315, Jun. 14, 1983, abandoned.

[30] Foreign Application Priority Data

| Jun. 16, 1982 | [JP] | Japan | 57-103362 |
| Jun. 16, 1982 | [JP] | Japan | 57-103363 |
| Jun. 16, 1982 | [JP] | Japan | 57-103364 |
| Jun. 16, 1982 | [JP] | Japan | 57-103365 |
| Jun. 16, 1982 | [JP] | Japan | 57-103366 |
| Jun. 22, 1982 | [JP] | Japan | 57-107071 |
| Jun. 22, 1982 | [JP] | Japan | 57-107072 |
| Jun. 22, 1982 | [JP] | Japan | 57-107073 |
| Jun. 22, 1982 | [JP] | Japan | 57-107074 |
| Jun. 22, 1982 | [JP] | Japan | 57-107075 |
| Jun. 22, 1982 | [JP] | Japan | 57-107076 |
| Jun. 22, 1982 | [JP] | Japan | 57-107077 |

[51] Int. Cl.[4] .................... A23J 1/04; A23L 1/325
[52] U.S. Cl. .................... 426/7; 426/643; 426/574
[58] Field of Search ............ 426/7, 48, 52, 56, 59, 426/643, 574

[56] References Cited

U.S. PATENT DOCUMENTS

| 3,099,562 | 7/1963 | Rogers | 426/7 |
| 3,826,848 | 7/1974 | Spinelli et al. | 426/7 |
| 4,016,295 | 4/1977 | Burrows et al. | 426/7 |
| 4,176,202 | 11/1979 | Decker et al. | 426/574 |

FOREIGN PATENT DOCUMENTS

| 2046356 | 3/1972 | Fed. Rep. of Germany | 426/7 |
| 2308320 | 12/1976 | France | 426/7 |
| 54-5057 | 1/1979 | Japan | 426/7 |

*Primary Examiner*—Esther M. Kepplinger
*Attorney, Agent, or Firm*—Birch, Stewart, Kolasch & Birch

[57] ABSTRACT

Protein food products or protein food materials in paste state are prepared by grinding the fish meat and treating the fish meat with proteolytic enzymes and/or protein digesting micro-organisms during and/or after grinding to change the properties of the protein contained in the fish meat to reduce or lose the gel forming ability of the protein contained in the fish meat, and food products in solid or spread are prepared by mixing animal and/or vegetable fats and/or oil sources and melting agents to the protein food materials in paste state, agitating the resulting mixture while heating to 50°~100° C. to form homogeneous mixture and cooling the mixture.

16 Claims, No Drawings

METHOD FOR PRODUCTION OF PROTEIN FOOD PRODUCTS OR PROTEIN FOOD MATERIALS IN PASTE STATE AND METHOD FOR THE PRODUCTION OF FOOD PRODUCTS FROM THESE MATERIALS

This application is a continuation of application Ser. No. 504,315 filed on June 14, 1983 now abandoned.

FIELD OF THE INVENTION

This invention relates to a method for preparing protein food products or protein food materials in a paste state and also food products developed from the protein food materials. More particularly, this invention relates to a method for protein food products or protein food materials in paste made of fish meat which is obtained by reducing or eliminating the gel forming ability which is inherent to fish meat and also for such products as solid or spread, resilient gel, fluid or liquid food products developed from the aforementioned protein food materials.

The term "Frozen Surimi" as used herein refers to a product made from fish meat which is minced, water-washed, combined with an antidenaturant, and frozen into a block and the term "Frozen Otoshimi" refers to collected fish meat.

BACKGROUND OF THE INVENTION

Traditionally, fish meat has been mainly used for the manufacture of a Japanese seafood specialty called "Neriseihin" or formed fish meat paste which is made from fish meat Surimi or a certain type of cominuted fish meat by adding starch, salt, seasonings, water and other ingredietns if necessary and processed by grinding, mixing, forming in molds, ad finally heating. The basic principle of the above processing is the gel forming ability inherent to fish meat.

Needless to say, these "Neriseihin" or formed fish meat paste are very important seafood products made from fish meat which has been a prime protein food resource for years here in Japan. And if the usage of fish meat can be diversified for basic materials for various kinds of processed food products other than "Neriseihin", the importance of fish meat as a protein food resource may be significantly expanded.

However, fish meat possesses an inherent property of gel forming. When fish meat is used for food products, this gel forming ability tends to form so called "Dama" or heterogeneous particles of meat ground, which spoils the appearance, texture, and mouth-feel thereof. In other words, while this forming ability inherent to fish meat is indispensable for "Neriseihin" production, it is desirable to reduce, if not eliminate, the ability when fish meat is to be used for materials in more diversified fields beyond "Neriseihin".

BRIEF SUMMARY OF THE INVENTION

The inventors, while studying possibilities whereby fish meat may be used for more diversified purposes, have found that fish meat could produce protein food products or protein food materials in a paste state for further processing by reducing or losing the gel forming ability caused by proteolytic enzymes or protein digesting micro-organisms during the course of fish meat processing.

In other words, this invention is a method for preparing protein food products or protein food materials in a paste state which is characterized by grinding fish meat and treating the fish meat with proteolytic enzymes and/or protein digesting micro-organisms during and/or after grinding to change the properties of the protein contained in the fish meat to reduce or eliminate the gel forming ability thereof and, if necessary, adding one or more selected sources of vegetable and/or animal protein food sources, vegetable and/or animal fats and oils sources, and carbohydrate sources before and/or during grinding and treating.

DETAILED DESCRIPTION OF THE INVENTION

Fish meat usable for this invention (fish herein mentioned indicates marine animals usable for ordinary fish food processing) includes fish meat collected from various material fishes, fish meat "Surimi", "Otoshimi", fresh or frozen, and various kind of fish meat, processed or non-processed among others.

Material fish herein mentioned includes, for example, pollock, cod, flatfish, turbot, perches, sardines, mackerels, pikes, croakers, horse mackerel, squids, tuna, skipjacks, swordfish, yellow tail, salmon, trout, herring, shark, octopus, shrimps, whales, scabbard fish, bastard halibut, warazuka, shell fishes among others.

The vegetable protein food source usable for the present invention includes such vegetable protein materials as for example soy bean, peanut, cotton seed, sesame, sun flower, wheat, and their oil extract products and concentrated protein desired therefore and isolated proteins and the like.

The animal protein food source usable for the present invention includes such animal protein materials as for example milk and milk products, skim milk, condensed milk, whole milk powder, skim milk powder, modified milk powder, butter, cheeses, cream, such livestock meat as beef, pork, mutton, chicken, such processed livestock meat as smoked meat, dried meat, such egg and egg products as whole eggs, frozen eggs, dehydrated eggs, egg white, egg-yolk, and other animal protein sources such as livers and the like.

The animal and/or vegetable fats and oils sources usable for the present invention include for example such animal fats and oils as beef tallow, lard, mutton tallow, horse tallow, milk fat, fish oil, whale oil, such vegetable fats and oils as soybean oil, linseed oil, safflower oil, sun flower oil, cotton seed oil, kapok oil, olive oil, corn oil, palm oil, palm kernel oil, sal fat, illipet butter, Borneo tallow, coconut oil, and their processed fats and oils obtained through such processes as hydrogenation, inter-esterification, fractionation and other such processed fat and oil products as butter, cream, margarin, shortenings among others.

The carbohydrate source usable for the present invention includes, for example, such carbohydrate rich agricultural products as rice, wheat, corn, potato, sweet potato, and their pulverized products, starches made therefrom, as rice starch, gluten, corn starch, potato starch, and such processed and denatured starches as α-starch, dextrin, such saccharoid as sucrose, honey, starch sugar, such fruit flesh or fruit juice thereof as apple, orange, and strawberry, among others.

The protein digesting enzymes usable for the present invention include for example such proteinase as Acrosin, Urokinase, Uropepsin, Elastase, Enteropeptidase, Cathepsin, Kallikrein, Kinase 2, Chymotrypsin, Chimopapain, Collagenase, Streptococcus peptidase-A, Subtilisin, Thermolisin, Trypsin, Thrombin, Papain, Pancreatopeptidase, Ficin, Plasimin, Renin, Reptilase, Rennin, Proteinase, such aminopeptidase as Arginin aminopeptidase, Oxidase, Leucine aminopeptidase, Angiotensinase, Angiotensine converting enzyme, Insurinase, such carboxy peptidase as Arginine carboxy peptidase, Kinase-1, Chroidpeptidase, such peptidase like other pronase as Carnosinase, Prolidase and similar peptidase and other protein digesting enzymes and their variants and prosthetic group.

The micro-organisms usable for the present invention include for example such molds as Aspergillus, Mucor, Rhizopus, Penicillium, Monascus, such lactobacilli as Streptococcus, Pediococcus, Leuconostoc, Lactobacillus, such bacteria as *Bacillus natto, Bacillus subtilis*, such yeasts as *Saccharomyces ellipsoideus, Saccharomyces cerevisiae*, Torula, and their variants and prosthetic group.

In order to prepare a homogeneous mixture of ground fish meat, proteolyctic enzymes and/or protein digesting micro-organisms are added to fish meat before or during or after grinding and then the mixture is sufficiently mixed to yield a homogeneous substance. In this process, when, besides fish, meat, animal and/or vegetable protein food sources, animal and/or vegetable fats and oils sources, and/or carbohydrate sources are used for as materials, they may be added thereto at the begining, or during the processes and other such ingredients as for example salt, salts like di-sodium phosphate and sodium polyphosphate, water, fats and oil, carbohydrate digesting enzymes or micro-organisms and/or natural anti-bacteria reagents can be added thereto in the same way.

Since the enzymes and/or micro-organisms readily start to work upon proteins contained in the fish meat or a mixture thereof, and the mixture and the ingredients added thereto, it is essential to maintain the mixture at a proper temperature for a proper time as previously designated after adding.

The temperature and time should be fixed depending on the specie of enzymes and/or micro-organisms employed, the tastes of protein food materials in paste desired, and the levels of their gel forming abilities, but usually temperatures range from 0° to 60° C. and times from 5 minutes to 30 days.

Regarding the temperature, one consistent temperature throughout a process is sometimes necessary, but multi-stage temperature control is also essential for varied temperatures which may be required for various stages.

After the enzymes and/or micro-organisms are added thereto, the mixture is ground and kneaded in order to yield a homogeneous state, and these steps can be carried out within the ranges of temperature and time mentioned above while grinding and kneading. Alternatively, grinding and kneading can be suspended when a homogeneous state is obtained, the mixture can then be aged, and grinding and kneading resumed with subsequent aging while holding the mixture within the ranges of the above temperatures and times throughout the processes.

During the processes of grinding or mixing, or aging when required, the holding temperatures of the mixture may be divided into three major zones, for example, the lower temperature zone ranging from 0° to 15° C., the middle from 15° to 35° C. and the upper from 35° to 60° C. When enzymes are used, the first stage may be maintained in the upper or middle temperature zone and the subsequent stage in the lower temperature zone. When micro-organisms together with enzymes are used, the first stage, where enzymes alone are employed, may be held in the upper or middle or lower temperature zone, and then cooled if necessary. Micro-organisms are added thereto and mixed to make a homogeneous mixture and subsequently held in the middle or lower temperature zone. When only micro-organisms are used, it is desirable to hold the mixture in the lower or middle temperature zone.

It is also desirable that materials for protein food materials in the paste state desired in the present invention should be arranged so that the ratio of the water-soluble protein to the total proteins is 5 to 50% (provided that when animal and/or protein food sources used together as materials, 5 to 60% instead). When the ratio is below 5%, the gel forming ability remains strong and the texture and the mouth feel are not sufficiently smooth. Conversely, when the ratio is above 50% (provided that animal and/or vegetable protein sources food sources used together for materials, 60% instead of 50%), the product has an undesirable bitter taste.

When the product obtained by the above mentioned method is left as it is, the properties and taste thereof are changed as time passes, since the enzymes and/or micro-organisms contained in the product continue further digestion. Therefore, the product should be used instantly for further processing and passed through the heat treatment in the process for producing the food. When the products of the present invention are stored and transported, the products should be subjected to heat-treatment, spray-drying or freezing to inactivate the enzymes and/or micro-organisms contained in the products, or a material capable of inactivating them should be added to the products of the present invention.

Since products desired in the present invention are rich in proteins derived from fish meat, they can be used not only for such products as baby foods, pudding-like products, Tofu-like products, yoghurt-like products, binders or ingredients for hamburgers, seasoned fish meat fiber products, protein drinks, soups, spreads, fluid food products for patients and the aged, sauces, steamed cup hotchpotch, cheese like products, mayonaise like products in their original forms when possible, but also basic materials for these products. Thus the products of this invention are very useful.

The products desired in the present invention mixed with animal and/or vegetable protein food sources, animal and/or vegetable fats and oils sources, ad carbohydrate sources among others can be used for various kinds of food products and basic materials thereof as well.

The inventors of the present invention examined methods for preparing various types of food products with food materials obtained through the procedures previously mentioned and have found the methods for preparing three main types of products, namely, solid or spread type, resilient gel type, and fluid or liquid type products.

Firstly, a production method for preparing solid and spread type products is described hereunder. A mixture is prepared by adding animal and/or vegetable fats and oils and melting agents and, desirably, animal and plant protein food sources and, if necessary, other ingredients to the protein food material in a paste. The other ingredients include, such seasonings as nucleic acid, amino acid like glutamic acid or their salts, such synthetic preservatives as sodium sorbate, and natural preservatives; such specialties as shrimps, crabs, beef, pork, chicken meat, livers, and short necked clams; and flavors for the said specialties are added and the resultant mixture is heated to 50° to 100° C., preferably, 60° to 90° C. while stirring to yield a homogeneous state.

Of the quantity of the animal and/or vegetable fats and oils sources and animal and/or vegetable protein food sources being added, it is desirable to set 5 to 50% by weight, particularly, 5 to 40% for the ratio of fats and oils to the all ingredients and 0 to 30%, particularly 5 to 20% for the protein sources other than fish meat.

As previously mentioned, homogenized components which are obtained by heating and melting are preferably cooled to 0° to 15° C. to produce final products in a solid and spread state.

Secondly, a production method for preparing resilient gel food products is as follows.

By adding water to protein food materials in paste as previously mentioned, and also grinding if needed, a slurry state substance is obtained and further subjected to heating and subsequent cooling to obtain resilient gel food products. In case the gel forming ability of the protein food sources is extremely low, it can be improved by adding such gel forming agents as, for example, agar-agar, furcellaran, carrageenan, pectin, gelatin, egg-yolk, whole egg, egg and white, and if necessary such seasonings as sugar stevioride, such seasonings as glutaminate and other amino acids and their salts, water holding agents such as starch, and other ingredients such as flavors, preservatives, and colorings, are added thereto to prepare desired products.

Resilient gel food products which are obtained in the present invention can be served to consumers in such forms as pudding like products and jelly like products, among others.

Thirdly, a production method for preparing fluid or liquid food products is as follows.

The slurry solution containing 2 to 10% protein is obtained by adding water to the protein food materials and by heating if necessary, and is subjected to cultivating with lactobacilli after sterilizing by heat to yield final products.

In preparing the slurry solution, agar-agar, skim milk, and other dairy products can be added thereto and sweetners such as succrose, stevioside, flavors, seasonings, and colorings may be added at any process of the production.

Regarding lactobacilli usable for the present invention, they include, as previously described, Streptococcus, Pediococcus, Leuconostoc, Lactobacillus, most preferably such loctobacilli as Streptococcus and Lactobacillus, and fermentation may be carried out at for example 15° to 55° C., preferably 30° to 45° C. Fluid or liquid food products obtained in the present invention are not only valuable as analogues or replacements for yoghurt, liquid yoghurt, fermented butter milk, acidphils milk, sour milk beverages, alcohlic fermented milk, and fermented milk products but also very useful for new types fluid or liquid food products which are different from conventional ones with unique taste and texture.

The present invention now will be described specifically with reference to working examples. This invention, however, should not be construed as being limited to these examples.

EXAMPLE 1

Frozen Pollock "Surimi" was thawed and minced by use of a meatchopper. 3 grams of salt, and 0.2 gram disodium phosphate were added to 100 grams of such minced "Surimi" while kneading in the kneader. 0.05 gram of a proteolytic enzyme, PANCREATIN (manufactured by Wako Junyaku) and 50 ppm Lysozyme as an anti-bacteria reagent each dissolved in a small amount of water added thereto was kneaded.

Upon adding all of the ingredients above mentioned, the temperature of the resultant mixture was raised to 50° C. by flowing hot water into the jacket of the kneader and held for 30 minutes while kneading and then cooled to 10° C. by replacing with cold water. The mixture thereafter was held at 10° C. for 48 hours to obtain the product desired in the present invention.

This product, with the ratio of the water soluble protein to the total proteins of 28%, had gel strength of 70 g/cm$^2$ measured by an ordinary method but had no bitter taste at all and was found very useful for paste protein food products or their materials with satisfactory texture and properties.

EXAMPLE 2

Frozen Pollock "Surimi" was thawed in ambient temperature and minced with meat-chopper. 100 grams of such minced "Surimi" was kneaded in a kneader adding 3 grams of salt, 0.2 gram sodium phosphate and 0.05 gram proteolytic enzyme, "PRONASE" (manufactured by Kaken Kagaku) dissolved in a minute amount of water beforehand.

After adding all the ingredients, the mixture in the kneader was heated to 50° C. by flowing hot water through the jacket of the kneader and held for 30 minutes while kneading. Then the mixture was cooled to 10° C. by replacing with cold water and when reduced to 10° C., 10 grams of culture solution of 10% skim milk powder solution with $10^8 \sim 10^9$ bacteria count cultivated by lactobacilli. *Streptococcus lactis, Lactobacillus casei, Streptococcus cremoris* was added thereto, further kneaded for 10 minutes and subsequently held at 10° C. for 72 hours to obtain the product desired in the present invention.

With the ratio of the water-soluble protein to the total proteins of 40%, the product having some aroma but no bitter taste at all was found to be a satisfactory protein food product or its material in paste state with a pleasant texture and attractive properties.

EXAMPLE 3

Frozen Pollock "Surimi" was thawed in ambient temperature and minced with a meat-chopper. 100 grams of such minced "Surimi" was placed in a kneader and kneaded while adding 2.5 grams of salt and 0.3 gram sodium polyphosphate to yield a paste product. When the paste product was obtained, 20 grams of soy protein "PROTON" M (Nihon Tanpaku) was kneaded while stirring to obtain homogeneous paste. To this paste, 0.08 gram of proteolytic enzyme, PRONASE (Kaken Kagaku) dissolved in a minute amount of water was added and also 50 ppm Lysozyme dissolved in a small amount of water were added thereto in order to inhibit the growth of the low temperature bacteria in Surimi. After adding all the additives, the mixture in the kneader was heated to 50° C. by flowing hot water through the jacket of the kneader and held for 30 minutes while kneading. Upon conclusion of mixing, the mixture in the kneader was cooled to 10° C. by replacing hot water in the jacket with cold water and then held at 10° C. for 48 hours to obtain the product desired in the present invention.

This product, with the ratio of water soluble protein to the total proteins of 30%, had very smooth texture but no bitter taste and was found to be a satisfactory protein food product or its material with extremely acceptable texture and properties.

EXAMPLE 4

Frozen Pollock "Otoshimi" was thawed in ambient temperature and minced with a meat-chopper. 100 grams of such minced Otoshimi and 3.5 grams salt and 0.2 gram sodium polyphosphate added thereto with stirring was mixed in the kneader while stirring to obtain the mixture in paste state. When the paste obtained, 20 grams of soyprotein "PROTON M" (Nihon Tanpaku) was added and kept stirring to yield homogeneous paste and then 0.2 gram proteolytic enzymes "PRONASE" (Kaken Kagaku) dissolved in a small amount of water added thereto. Upon adding, the mixture thus obtained was heated by flowing hot water through the jacket of the kneader and kept mixing at 50° C. for 30 minutes and then cooled to 10° C. by replacing with cold water. When came down to 10° C., 10 grams of culture solution with bacteria count $10^8 \sim 10^9$ of 10% skim milk powder solution cultivated by lactobacilli, *Streptococcus lactis, Streptococcus cremoris, Lactobacillus casei* and 5 grams glucose were added to the mixture and kneaded for 10 minutes. Then the mixture was held at 10° C. for 72 hours to obtain the product desired in the present invention.

The product, with the water soluble protein to the total proteins ratio of 36%, had very smooth texture, pleasant aroma but no bitter taste and was found to be a satisfactory paste protein food product or its material with excellent properties and mouth feels.

EXAMPLE 5

Frozen Pollock "Surimi" was thawed in ambient temperature and minced with a meat-chopper. 100 grams of such minced Surimi was placed in a kneader and 3 grams of salt and 0.2 gram disodium phosphate added thereto while stirring were mixed to yield a paste. When the paste was obtained, 15 grams of sodium caseinate was added and mixed thoroughly to yield a homogeneous mixture.

Then 0.06 gram of proteolytic enzyme, "PRONASE" (Kaken Kagaku) dissolved in a small amount of water was added to the mixture and further added 50 ppm Lysozyme dissolved in a minute amount of water for inhibiting bacteria growth in Surimi. After adding the all additives, the mixture in the kneader was heated to 50° C. by flowing hot water through the jacket of the kneader and held mixing while stirring for 30 minutes and then quickly cooled to 10° C. by replacing with cold water. Subsequently, it was held at 10° C. for 48 hours to obtain a product desired in the present invention.

This product with the water-soluble protein to the total proteins ratio of 26% was smooth and homogeneous and was found to be a satisfactory paste protein food products or its material with excellent properties and texture.

EXAMPLE 6

Frozen Pollock "Otoshimi" was atmospherically defrosted and minced with a meat-chopper. 100 grams of such minced Otoshimi was placed in a kneader and 3.5 grams of salt and 0.2 gram sodium polyphosphate added thereto were sufficiently mixed to yield a homogeneous mixture. When the mixture was obtained, 25 grams of natural cheese strained beforehand was added thereto and kneaded until a homogeneous paste was obtained by having the Otoshimi moisture absorbed by the natural cheese.

Then 0.07 gram of proteolytic enzyme "PRONASE" (Kaken kagaku) dissolved in a small amount of water was added to the mixture and after adding, the mixture in the kneader was heated to 50° C. by flowing hot water through the jacket of the kneader, mixed while stirring at 50° C. for 30 minutes and then quickly cooled to 10° C. by replacing with cold water.

When came down to 10° C., 10 grams of culture solution with the bacteria count of $10^8 \sim 10^9$/ml of skim milk powder solution cultivated by lactobacilli, *Streptococcus lactis, Streptococcus cremoris, Lactobacillus casei* was added to the mixture, then added 2 grams glucose, mixed while stirring for 10 minutes, and held at 10° C. for 72 hours to obtain a product desired in the present invention.

This product had the ratio of the water-soluble protein to the total protein of 35% and was smooth and fragrant and was found to be highly satisfactory paste protein food product or its material with very pleasant mouth-feel and properties.

EXAMPLE 7

Frozen Pollock "Surimi" was defrosted atmospherically and minced with a meat-chopper. 100 grams of such minced Surimi was placed in a kneader and while stirring mixed with 3 grams of salt and 0.2 gram sodium polyphosphate added thereto to yield Surimi paste. When the paste was obtained, while kept stirring, 20 grams of safflower oil with 300 ppm 2-Tocopherol added thereto were slowly added to the paste to yield an emulsion and to this emulsion, 0.07 gram of proteolytic enzyme "PRONASE" (Kaken Kagaku) and 50 ppm Lysozyme for inhibiting bacteria grown in Surimi each dissolved in a small amount were added.

After adding all the additives, the mixture in the kneader was heated to 50° C. by flowing hot water through the jacket of the kneader and kept kneading for 30 minutes. Subsequently, the mixture was quickly cooled to 10° C. by replacing with cold water and held at 10° C. for 48 hours to obtain a product desired in the present invention.

The product with the ratio of the water-soluble protein to the total protein of 25%, the gel strength of 7 g/cm$^2$ measured by the ordinary method, had no bitter taste but smooth paste state and was found to be a satisfactory paste protein food product or its material with very pleasant texture and properties.

EXAMPLE 8

Frozen Pollock "Otoshimi" was atmospherically defrosted and minced with a meat-chopper. 100 grams of such minced Otoshimi was placed in a kneader and 3.0 grams salt and 0.2 gram sodium pyrophosphate added thereto was mixed while stirring to yield a paste. 25 grams of soybeam oil added α-Tocopherol, anti-oxidant, thereto beforehand was gradually added to the paste and kept kneading to yields O/W emulsion, to which 0.07 gram of proteolytic enzyme, "PRONASE" (Kaken Kagaku) dissolved in a small amount of water was added.

After adding the all additives, the mixture in the kneader was heated to 50° C. by flowing hot water through the jacket of the kneader and kept mixing and stirring at 50° C. for 30 minutes and then cooled to 15° C. by replacing with cold water. Then 10 grams of culture solution with the bacteria count of $10^8 \sim 10^9$/ml of 10% skim milk powder solution cultivated by lactobacilli, *Streptococcus lactis, Streptococcus cremoris, Lactobacillus casei* and 5 grams glucose was added to the mixture and kept mixing and stirring for 30 minutes and subsequently held at 15° C. for 72 hours to obtain a product desired in the present invention.

This product had the ratio of the water-soluble protein to the total proteins of 31% and the gel strength of 3 g/cm$^2$ and was smooth and soft paste and was found to be a satisfactory paste protein food product or its material with very pleasant texture and properties.

EXAMPLE 9

100 grams of frozen Pollock "Surimi" thawed and minced with meat-chopper was placed in a kneader and 3.0 grams of salt and 0.2 gram disodium phosphate added thereto were mixed and stirred to yield a paste. To this paste, 25 grams of potato starch was added and the mixture was kneaded to yield a homogeneous one, to which 0.07 gram of proteolytic enzyme "PRONASE" (Kaken Kagaku) and 70 ppm Lysozyme as an anti-bacteria reagent each dissolved in a small amount of water were added.

Subsequently, the mixture in the kneader was heated to 50° C. by flowing hot water through the jacket of the kneader, kept kneaded for 30 minutes, then cooled to 15° C. by replacing with cold water. When came down to 15° C., stopped the mixing and the mixture was packed in a container and held at 15° C. for 72 hours to obtain the product desired in the present invention.

This product had the ratio of the water soluble protein to the total protein of 25%, no bitter taste and was smooth paste and was found to be a satisfactory paste protein food product or its material with very pleasant texture and properties.

EXAMPLE 10

100 grams of frozen Pollock "Otoshimi" thawed and minced with a meatchopper was placed in a kneader and 3.0 grams of salt and 0.2 gram sodium pyrophosphate added thereto were kneaded to yield a paste and this paste and 25 grams of flour added thereto were further kneaded to produce a homogeneous substance. To this substance, 0.1 gram of proteolytic enzyme, "PANCREATIN" (Difco) and 0.1 gram "PROTENASE" AMANO-A (Amano Pharm) and 70 ppm Lysozyme as an anti-bacteria reagent each dissolved in a small amount of water were added and the mixture was heated to 50° C. and kneaded at high speed for 30 minutes. After kneading, the mixture was packed in a container and held at 15° C. for 120 hours to yield a product desired in the present invention.

This product with the ratio of the water soluble protein to the total proteins of 35% was homogeneous, smooth, not bitter and was found to be a satisfactory paste protein food product or its material with very pleasant texture and properties.

EXAMPLE 11

Frozen Pollock "Surimi" was thawed and minced with a meat-chopper and 100 grams of such minced Surimi was placed in a kneader and the minced Surimi and 3.0 grams of salt and 0.2 gram sodium polyphosphate added thereto were sufficiently kneaded to product a paste substance. To this paste, 0.07 gram of proteolytic enzyme, "PRONASE" (Kaken Kagaku) and 50 ppm Lysozyme as an anti-bacteria reagent each dissolved in a small amount of water were added while mixing and stirring.

After adding all the additives, the mixture in the kneader was heated to 50° C. by flowing hot water through the jacket of the kneader and kept stirring at 50° C. for 30 minutes. When the stirring completed, the mixture was cooled to 10° C. by replacing hot water with cold water in the jacket and then held at 10° C. for 72 hours. The paste protein food-stuff thus obtained was minced with a meat-chopper. 100 grams of resultant paste protein food materials minced was placed in a kneader and 20 grams of sodium caseinate added thereto were well mixed while stirring to yield a homogeneous paste and 20 grams vegetable oil (safflower oil) further added slowly to produce emulsion. Then, to this emulsion, the mixture of 20 grams of natural Chedder cheese and 20 grams Gouda crushed with a meat-chopper beforehand was added and at the same time as melting agent 0.2 gram disodium phosphate and 0.5 gram sodium polyphosphate as an anti-bacteria reagent 0.1 gram potasium sorbinate, and also a little flavor were added. After adding the all additives, the mixture in the kneader was heater to 80° C. by flowing hot water through the jacket of the kneader and thoroughly melted while stirring to yield a homogeneous mixture with the viscosity of 150 pois (80° C.). This melted mixture was placed in molds and cooled to 10° C. to obtain a product desired in the present invention. The product thus obtained possessed the same hardness as processed cheese and was no fishly smell inherent to fish meat and was found to be suitable as a processed cheese analogue with smooth texture and good mouthfeel.

EXAMPLE 12

Frozen Pollock "Otoshimi" was thawed and minced with a meat-chopper and 100 grams of such minced Otoshimi was placed in a kneader and kneaded. To this, 3.0 grams of salt and 0.2 gram disodium phosphate were added and kneaded to yield a paste substance, to which 0.1 gram of proteolytic enzyme, "PRONASE" (Kaken Kagaku) dissolved in a small amount of water was further added.

After adding completed, the mixture was heated to 50° C. by flowing hot water through the jacket of the kneader and kept stirring at 50° C. for 30 minutes and then cooled to 10° C. by replacing with cold water. Then 20 grams of culture solution with the bacteria count of $10^8 \sim 10^9$/ml of 10% skim milk powder solution cultivated by lactobacili, *Streptococcus lactis, Streptococcus cremoris,* and *Lactobacilus casei* and 5 grams glucose were added to this mixture, held at 10° C. and further kept stirring for 30 minutes at 10° C. by flowing cold water through the jacket and held at 10° C. for 72 hours to get a fragrant paste protein food material.

This paste protein food material was minced in a meat-chopper. 125 grams of the resultant product was placed in a agi-homomixer and mixed with 10 grams sodium caseinate while agitating and melted to yield a homogeneous mixture. 40 grams of vegetable oil (repeseed shirashime oil) was slowly added to the mixture to obtain emulsion. When the emulsification completed 30 grams of Liver paste commercially available from Meijiya crushed with a meat-chopper beforehand, condiments and flavor each a little, 0.2 gram sodium tripolyphosphate and 0.3 gram sodium pyrophosphate as meting agent were added thereto and the resultant mixture was heated to 80° C. by flowing hot water through the jacket of the "agi-homo-mixer", kept agitating, placed in cups, and cooled to 10° C. to obtain a product desired in the present invention.

This product was smooth and highly spreadable, but neither fishy no bitter and was found to be a satisfactory paste food product same as liver pastes available in the market.

EXAMPLE 13

100 grams of frozen Pollock "Surimi" was thawed and minced with a meat-chopper and 3.0 grams of salt and 0.2 gram disodium phosphate added thereto were kneaded in a kneader to yield a paste substance. To this paste, 25 grams of vegetable protein, named "PROTON M" (Nihon Tanpaku) was added and kneaded for homogeneous paste and then 0.08 gram of proteolytic enzyme, "PRONASE" (Kaken Kagaku) and 65 ppm Lysozyme as an anti-bacteria reagent each dissolved in a small amount of water were added. After adding the all additives, the mixture in the kneader was heated to 50° C. by flowing hot water through the jacket of the kneader and kept kneading for 30 minutes and thereafter cooled to 10° C. by replacing hot water with cold water in the jacket. The mixture was placed to a container and held at 10° C. for 72 hours to obtain paste protein food material.

130 grams of such paste was placed in a agi-homomixer (commercially named and manufactured by Tokushu Kakoki) and 20 grams of natural cheese Cheddar and 30 grams Gouda each crushed with a meatchopper beforehand and 25 grams vegetable oil (salad shirashime oil) were added thereto and further as melting agent 0.5 gram sodium polyphosphate 0.2 gram sodium pyrophosphate, a little cheese flavor and 5 grams sodium glutamate were added thereto. Subsequently the mixture was heated to 80° C. by flowing hot water through the jacket of the agihomo-mixer while agitating and kneading and simultaneously heat-melted at vacuum 25 mm Hg and at high speed to yield a mixture in paste state, which was placed in molds and cooled to 10° C. to obtain a product desired in the present invention.

This product was not bitter but smooth and was found to be same texture as processed cheese available in the market without a trace of fishy smell.

EXAMPLE 14

100 grams frozen Pollock "Otoshimi" after defrosting and mincing with a meat-chopper was mixed with 3.0 grams of salt and 2 grams sodium polyphosphate added thereto and well kneaded in a kneader to obtain a paste substance. To this paste, 20 grams of soybeam protein "PROTON M" (Nihon Tanpaku) was added and homogeneously dissolved. Subsequently, 0.1 gram of proteolytic enzyme, "PRONASE" (Kaken Kagaku) dissolved in a small amount of water was added thereto. Upon adding the all additives, the mixture in the kneader was heated to 50° C. by flowing hot water through the jacket of the kneader and held for 30 minutes while kneading and then cooled to 10° C. by replacing hot water with cold water in the jacket.

Subsequently, 20 grams of culture solution with the bacteria count of $10^8 \sim 10^9$/ml of 10% skim milk powder solution cultivated by lactobacilli, *Streptococcus cremoris, Streptococcus lactis, Lactobacillus casei* and 5 grams glucose were added to the mixture and the mixture was kept kneading for 30 minutes. Then it was held at 10° C. for 72 hours to obtain a paste protein food material with fragrant flavor.

145 grams of this paste was placed in an agi-homomixer and 30 grams vegetable oil (rape seed shirashime oil) slowly added thereto while agitating to obtain an emulsion. When the emulsion obtained, 30 grams of soft cheese previously treated with a meat-chopper together with 0.2 gram sodium polyphosphate and 0.2 gram sodium tripolyphosphate as melting agents and a little flavor were added thereto, heated to 80° C. by flowing hot water through the jacket of the agi-homo-mixer, and agitated at high speed to obtain the mixture in paste state, which was placed in molds and cooled to 10° C. for final products desired in the present invention.

This product was neither bitter in taste nor fishy in smell but smooth and spread well when served on breads and was found satisfactorily similar to cheese spread available in the market.

EXAMPLE 15

Frozen Pollock "Surimi" was thawed and minced with a meat-chopper. 100 grams of such minced Surimi was placed and kneaded in a kneader and 3.5 grams of salt and 0.2 gram sodium pyrophosphate were added to yield a paste substance. To this mixture, 25 grams sodium caseinate was added and mixed well for homogeneous paste, to which 0.1 gram proteolytic enzyme "PRONASE" (Kaken Kagaku) dissolved in a small amount of water was added and further 65 ppm Lysozyme as an antibacteria reagent dissolved in a small amount of water was added.

After adding the whole additive, the mixture in the kneader was heated to 50° C. by flowing warm water through the jacket of the kneader and kept agitating for 30 minutes, then cooled to 10° C. by replacing with cold water and held at 10° C. for 72 hours to yield a protein food material in paste state. 130 grams of this paste was placed in an agi-homo-mixer and 35 grams of vegetable oil (safflower oil) was slowly added thereto while agitating to yield an emulsion. Subsequently, 20 grams of natural cheese Chedder, 20 grams Gouda crushed with a meat-chopper beforehand, a little cheese flavor, as melting agents 0.2 gram sodium pyrophosphate and 0.5 gram sodium polyphosphate were added to the mixture and strongly agitated at vacuum of 35 mm Hg while heating to 80° C. by flowing hot water through the jacket of the agi-homo-mixer to obtain the mixture in paste state. This resultant mixture was placed to moulds and cooled to 10° C. to obtain a product desired in the present invention.

This product did neither smell fishy at all nor taste bitter but smooth texture and was found to be satisfactory product with the same mouth-feel as that of processed cheese which hardly reminded fish meat.

EXAMPLE 16

100 grams frozen Pollock "Otoshimi" prepared by thawing and mincing with a meat-chopper and 3.0 grams of salt and 0.2 grams sodium polyphosphate added thereto were kneaded in a kneader to yield a paste substance and to this paste 20 grams sodium caseinate was added and dissolved while kneading to obtain a homogeneous mixture. Subsequently, 0.1 gram proteolytic enzyme, "PRONASE" (Kaken Kagaku) dissolved in a small amount of water was added to the mixture. After adding all the additives, the mixture in the kneader was heated to 50° C. by flowing warm water through the jacket of the kneader and held for 30 minutes while kneading and cooled to 10° C. by replacing with cold water in the jacket.

Subsequently, 20 grams of culture solution with the bacteria count of $10^8 \sim 10^9$/ml of 10% skim milk powder solution cultivated by lactobacilli, *Streptococcus cremoris, Streptococcus lactis, Lactobacillus casei* and 5 grams glucose were added thereto and kneaded for 30 minutes and then held at 10° C. for 72 hours to obtain a protein food material in paste state with fragrant flavor.

145 grams of this material was placed in an "agi-homo-mixer" and 30 grams of non-salt butter, 30 grams soft cheese for consumer market (Meijiya) chopped beforehand, 0.2 gram sodium tripoly-phosphate and 0.3 gram sodium polyphosphate as melting agents, a little flavor, and sodium glutamate were added thereto and the mixture was kneaded at vacuum 20 mmHg and at high speed while heating to 80° C. by flowing hot water through the jacket of the "agi-homo-mixer" to yield a homogeneous paste and then placed in cups and cooled to 10° C. to obtain a product desired in the present invention.

This product was neither bitter nor fishy but highly spreadable when served on breads and was found to be a satisfactory product same as cheese spreads available in the market.

EXAMPLE 17

100 grams of frozen Pollock "Surimi" thawed and minced with a meat-chopper was placed in a kneader and 3.5 grams salt and 0.2 gram sodium pyrophosphate added thereto were kneaded to yield a paste substance. To this paste, 25 grams vegetable oil (Safflower) was slowly added while kneading to yield an emulsion for a homogeneous mixture. To this mixture thus obtained, 0.08 gram protein digesting enzyme, "PRONASE" (Kaken Kagaku) and 50 ppm Lysozyme as anti-bacteria reagent, each dissolved in a small amount were added.

After adding all the additives, the mixture in the kneader was heated to 50° C. by flowing warm water through the jacket of the kneader and held for 30 minutes and then cooled to 15° C. by replacing with cold water in the jacket. The mixture thus obtained was packed in a container and held for 72 hours to yield a protein food material in paste state. 130 grams of the paste thus obtained was placed in an agi-homo-mixer and 25 grams of natural cheese Chedder and 35 grams Gouda, as melting agents 0.5 gram sodium polyphosphate and 0.2 gram sodium pyrophosphate, 0.4 gram anti-bacterial reagent and a little cheese flavor were added and kneaded. The resultant mixture in the agi-homo-mixer was heated to 80° C. by flowing hot water through the jacket of the "agi-homo-mixer" and heat-kneaded at vacuum of 35 mmHg and at high speed to obtain a mixture in paste. Subsequently the mixture was placed in moulds and cooled to obtain a product desired in the present invention.

This product was smooth and homogeneous but not bitter nor fishy at all and was found to be a satisfactory product with pleasant mouth feel like processed cheese available in the market besides a smooth cut end.

EXAMPLE 18

100 grams of frozen Pollock "Otoshimi" thawed and minced with a meat-chopper was placed in a kneader and 3.0 grams of salt and 0.2 gram sodium pyrophosphate added thereto were kneaded to yield a paste substance. To this paste, 25 grams non salt butter was mixed and well kneaded at high speed to obtain a homogeneous mixture. Then 0.1 gram proteolytic enzyme, "PRONASE" (Kaken Kagaku) dissolved in a small amount of water was mixed. After mixing, the mixture was heated to 50° C. by flowing warm water through the jacket of the kneader and held kneading for 30 minutes and then cooled to 15° C. by replacing warm water with cold water in the jacket.

Subsequently, 20 grams of culture solution with the bacteria count of $10^8 \sim 10^9$ml of 10% skim milk powder solution cultivated by lactobacilli, *Lactobacillu casei, Lactobacillus bulgaricus, Streptococcus lactis,* 5 grams aqueous solution of pulverized bacteria bodies, cultivated from *Penicillium lockforti*, and 5 grams glucose were added to the mixture and the mixture was held kneading for 30 minutes. After kneading, it was placed in a container and held at 15° C. for 120 hours to obtain a protein food material with fragrance flavor.

155 grams of the paste protein food material thus obtained was placed in an "agi-homo-mixer" and 25 grams of natural cheese Chedder and Gouda both crushed with a meat-chopper previously, 0.3 gram sodium polyphosphate and 0.2 gram sodium pyrophosphate, 0.4 gram an anti-bacteria reagent, and a little cheese flavor were added. After adding and mixing all the additives, the mixture was heated to 80° C. by flowing hot water through the jacket of the "agi-homo-mixer" and agitated at vacuum of 35 mmHg and at high speed to obtain a highly liquid mix in paste, which was cooled to 10° C. to obtain product desired in the present invention.

This product has fragrant flavor a little like blue cheese, smooth texture, and consistency and no bitter taste non fishy smell hardly reminding fish meat and was found closely resembled to cheese spread available in the market with its excellent spreadable property when served on bread.

EXAMPLE 19

100 grams of frozen Pollock "Surimi" thawed and minced with a meat-chopper was placed in a kneader and 3.1 grams of salt and 0.2 gram of disodium phosphate were added and kneaded to make a paste substance. To this mixture, 25 grams potato starch was added and kneaded to make homogeneous and 0.07 gram proteolytic enzyme, "PRONASE" (Kaken Kagaku) and 70 ppm Lysozyme as an anti-bacteria reagent each dissolved in a small amount of water were added thereto. Thereafter, the mixture was heated to 50° C. by flowing warm water through the jacket of the kneader and kept kneading for 30 minutes, when cooled to 15° C. by replacing warm water with cold water in the jacket. As soon as the temperature came down to 15° C., stopped kneading, and the mixture thus obtained placed in a container and held at 15° C. for 72 hours to obtain a protein food material in paste state.

130 grams of the protein food material thus obtained was placed in a emulsifier and 25 grams natural cheese Chedder and Gouda crushed with a meat-chopper beforehand, 10 grams vegetable oil (Safflower oil), 0.2 gram sodium pyrophosphate and 0.3 gram sodium polyphosphate as melting agents, 0.4 gram an anti-bacteria reagent, a little cheese flavor were added thereto and kneaded at low speed while heating to 80° C. by flowing hot water through jacket of the emulsifier and simultaneously applying vacuum at 35 mmHg and changing to high speed to yield a mixture in paste state. This paste obtained was placed in molds and cooled to 10° C. to obtain a product desired in the present invention.

This product and no bitter taste nor fishy smell at all but smooth and consistent texture and was found to be a satisfactory product same as processed cheese with pleasant mouth feel and good melt in mouth.

EXAMPLE 20

100 grams of frozen Pollock "Otoshimi" thawed and minced with a meat-chopper was placed in a kneader and 3.0 grams of salt and 0.2 gram sodium pyrophosphate added thereto and kneaded to yield a paste substance. To such paste, 20 grams flour was mixed to make homogeneous. To the mixture thus obtained, 0.1 gram proteolytic enzyme, "PANCREATIN" (Difco), 0.05 gram carbohydrate digesting enzyme, "KOKURASE" (SANKYO), 70 ppm Lysozyme as an anti-bacteria reagent, each dissolved in a small amount of water were added and the mixture thus obtained was well kneaded. After adding all the additives, the mixture was heated to 45° C. by flowing warm water through the jacket of the kneader and kneaded for 30 minutes. Then cooled to 15° C. by replacing with cold water and the mixture was placed in a container and held at 15° C. for 120 hours to obtain a protein food material in paste state. 125 grams of the paste thus obtained was placed in an agi-homo-mixer and 10 grams sodium caseinate added thereto and 25 grams natural cheese Chedder and 25 grams Gouda crushed with a meat-chopper previously, 20 grams non salt butter, 0.5 gram sodium tripolyphosphate and 0.2 gram sodium polyphosphate as melting agents, 0.4 gram anti-bacteria reagent, and a little cheese flavor were added and kneaded at low speed and heated to 80° C. by flowing hot water through the jacket of the agi-homomixer and simultaneously changed to high speed kneading while applying vacuum at 35 mmHg to obtain a mixture in paste state, which was placed in molds and cooled to obtain a product desired in the present invention.

This product was not bitter but smooth and consistant and fishy smell could not be traced therefrom at all and it was found to be a satisfactory product closely resembling to processed cheese available in the market with bright cut ends, smooth melt in mouth, and pleasant mouth-feel.

EXAMPLE 21

Frozen Pollock "Otoshimi" was thawed and minced with a meat-chopper. 3.0 grams of salt and 0.2 gram of disodium phosphate were added to 100 grams of this minced "Surimi", which was kneaded to obtain paste product. Thereto, proteolytic enzymes, 0.03 gram of PRONASE (Kaken Kagaku) and 0.05 gram of PANCREATIN (Difco) and 50 ppm of Lysozyme as anti-bacteria reagent, each dissolved in small amount of water, were added and the mixture was kneaded. Then the mixture was heated to 50° C. by flowing hot water into the jacket of the kneader and kneaded for 30 minutes and upon completion, the hot water in the jacket was replaced with cold water to cool its temperature to 10° C. When came down to 10° C., the mixture was placed in a container and held at the same temperature of 10° C. for 72 hours to obtain protein food material in paste. 30 grams of sugar and 100 grams water were added to 40 grams of the protein food material, which was in turn kneaded to obtain homogeneous solution and then 5 grams corn starch was added, kneaded, and heated to 70° C. to produce viscose solution.

Vanilla essence and natural coloring agent of egg-yolk color in small quantity were added to this solution, which was filtered with a sieve, fully poured into pudding molds thinly plated with caramel in advance, which were placed in the iron vessel filled with hot water, and baked at 150° C. in an oven to obtain the product desired in this invention.

This product did neither smell fishy nor taste bitter and was found to be smooth puddings with pleasant resilience.

EXAMPLE 22

100 grams of frozen "Otoshimi" thawed and minced through a meat-chopper was mixed while kneading with 3.0 grams of salt and 0.2 gram sodium pyrophosphate to yield a paste substance. To such paste substance, proteolytic enzymes, 0.5 gram of PROTEINASE "AMANO A" (amano Pharm) and 0.1 gram PANCREATIN (Difco) and 50 ppm Lysozyme as anti-bacteria reagent each dissolved in minute amount of water were added and kneaded. Upon start of mixing, the mixture was heated to 50° C. by flowing hot water through the jacket of the kneader and kept kneading at high speed for 30 minutes and then cooled to 10° C. by replacing with cold water. When the temperature of the mixture came down to 10° C., it was packed in a container and held at the same temperature for 48 hours to yield a protein food material in paste.

45 grams of such protein food material was mixed with 100 grams water and 10 grams sugar, and heated to 60° C. to make homogeneous liquid, which further kneaded slowly with solution prepared by well mixing 30 grams whole eggs and 10 grams sugar in a bowl dropping a minute amount of vanilla coloring and flavor, thereto, filtered, and fully filled into pudding molds lightly fed with caramel beforehand, which in turn placed in an iron sheet vessel with hot water therein, and baked in an oven at 150° C. to obtain the product desired in the present invention.

This product did neither smell fishy nor taste bitter but was found to be a satisfactory pudding product with pleasant resilience and gel strength.

EXAMPLE 23

100 grams of the paste substance prepared as in the EXAMPLE 21 was mixed well while stirring with 25 grams of sodium caseinate to yield homogeneous mixture. To such mixture, proteolytic enzymes, 0.05 gram of PRONASE (Kaken Kagaku), 0.1 gram PANCREATIN, (Difco), and 50 ppm of Lysozyme each dissolved in minute amount of water were added and mixed with stirring. After kneading at high speed for 30 minutes, the mixture was packed in a container and held at 15° C. for 120 hours to yield protein food material in paste.

30 grams of such paste was mixed with 40 grams of sugar and 5 grams skim milk powder adding 100 ml water to yield homogeneous solution, which was sterilized at 100° C. for 30 minutes and cooled to 60° C. and mixed with a minute amount of coloring and vanilla flavor. After filtering the solution which was prepared by dissolving 4 grams agar-agar in 100 grams water and then heated, was added to the above solution to make homogeneous, poured into molds, and cooled to obtain the product desired in the present invention.

This product did neither smell fishy nor taste bitter but was found to be satisfactory jellies with pleasant resilience.

EXAMPLE 24

The paste substance was prepared with frozen "Otoshimi" according to the production method in the EXAMPLE 22. After slowly adding 25 grams of safflower oil thereto, 100 grams of such paste was mixed at high speed to yield homogeneous emulsion. To the mixture thus obtained 25 grams of culture solution of 10% skim milk powder solution cultivated by lactobacilli, *Lactobacillus casei, Streptococcus lactis, Streptococcus cremoris*, beforehand was added and kneaded at high speed in the kneader for 30 minutes and upon completion, the mixture was placed in a container and held at 15° C. for 144 hours to obtain protein food material which possessed pleasant aroma. 30 grams of such protein food material was mixed with 60 grams sugar and skim milk powder, 100 grams water added to yield homogeneous solution, sterilized at 100° C. for 30 minutes, cooled to 60° C., and well mixed with solution which was prepared by melting 10 grams gelatine softened in 100 grams water beforehand. This mixed solution was placed in a pan, lemon juice squeezed from a fresh lemon and its peds added to, heated by fire, and filtered with clean cloths. The solution was poured into molds and coagulated to yield the product desired in the present inventioned.

This product did neither smell fishy nor taste bitter but was found to be resilient gel product with smooth texture and lemon fragrance.

EXAMPLE 25

The "Otoshimi" paste was prepared with frozen Pollock "Otoshimi" by following the procedure described in the EXAMPLE 22. 100 grams of such paste and 25 grams "PROTON M" commercially named added thereto was kneaded at high speed in the kneader to yield a homogeneous mixture, which was further kneaded with the solution of 0.1 gram proteolytic enzyme, "PRONASE" (Kaken Kagaku) dissolved in small amount of water. At the same time, the mixture was heated to 50° C. by flowing hot water to the jacket of the kneader and held agitating for 30 minutes and then by replacing with cold water in the jacket, cooled to 15° C. Upn reaching 15° C., 25 grams of the culture solution of 10% skim milk powder solution cultivated by lactobacilli, *Lactobacillus casei, Streptococcus lactis, Streptococcus cremoris* were added to the mixture, which was kneaded for 30 minutes, and then placed in a container and held at 15° C. for 96 hours to obtain the protein food materials in paste state. 45 grams of the resultant material was processed according to the procedure described in the EXAMPLE 22 to obtain the product desired in the present invention.

This product did neither smell fishy nor taste bitter but was found to be a satisfactory gel product with pleasant resilience.

EXAMPLE 26

The paste "Surimi" was prepared with frozen Pollock "Surimi" by following the procedure shown in the EXAMPLE 21. 100 grams of such paste and 20 grams corn starch added thereto were kneaded to yield homogeneous mixture. 0.15 gram of a proteolytic enzyme, PANCREATIN (Difco) dissolved in small amount of water beforehand was added to this mixture, which was kneaded at high speed for 30 minutes. Subsequently, the resultant mixture and 25 grams culture solution of 10% skim milk powder solution cultivated by lactobacilli, *Lactobacillus casei, Streptococcus cremoris*, and *Streptococcus lacti* added thereto were mixed for 30 minutes, packed in a container, and held at 15° C. for 120 hours to produce paste protein food material. 40 grams of this paste was processed according to the procedure shown in the EXAMPLE 23 to obtain a product desired in the present invention.

This product was resilient gel product without fishy smell or bitter taste.

EXAMPLE 27

The paste "Surimi" was prepared with frozen "Surimi" by following the procedure described in the EXAMPLE 21. 100 grams of such paste and 25 grams dehydrated egg while added thereto was kneaded to yield homogenous mixture and then processed for a protein food material in paste by following the production method shown in the EXAMPLE 23.

40 grams of this paste protein food material was processed by following the method shown in the EXAMPLE 1 to obtain a product desired in the present invention. This product was a satisfactory gel product without fishy smell or bitter taste.

EXAMPLE 28

100 grams of frozen "Surimi" was thawed, minced by a meat-chopper and added 3.0 grams of salt and 0.2 gram of sodium pyrophosphate and kneaded to produce paste Surimi. To this paste substance, 0.5 gram proteolytic enzymes, PRONASE (Kaken Kagaku) and 0.05 gram PROTINASE AMANO "A" (Amano Seiyaku), 50 ppm Lysozyme as anti-bacteria reagent, each of which was dissolved in small amount of water beforehand, were added. Upon adding, the kneading was accelerated to high speed and kept kneading for 30 minutes at 50° C. at the center of the mixture by flowing hot water through the jacket of the kneader. When the time elapsed, the flow was replaced with cold water to cool the said mixture to 15° C., where the mixture was packed in a container and held at the same temperature at 15° C. for 72 hours to produce protein food materials in paste.

100 grams of such protein food material was placed into a beaker, mixed with 10 grams skim milk powder, added 100 grams water and further mixed with a homomixer to produce homogeneous and rather viscose solution, which was heated to 50° C. and added 16 grams sucrose and mixed well to make solution. And it was sterilized at 100° C. for 30 minutes to inactivate the enzymes and then cooled to 37° C.

Apart from the above, lacto bacilli, *Streptococcus thermophilus, Streptococcus lactis, Lactobacillus bulgaricus* were cultured with 10% skim milk powder solution and its culture solution thus obtained was crushed well to leave no lump.

5 grams of this culture solution was added to the above mentioned solution, which was then packed into yoghurt bottles of 100 ml net that had been left dried subsequent to steam sterilization previously.

After capped with paper caps, they are placed in a thermostat at 37° C. for 7 hours for fermentation. Upon completion of the fermentation, they were held at 5° C.

for 12 hours to produce the products desired in present invention.

The products with acidity degree of 0.8% had a smooth texture and pleasantly sour flavor without bitter taste or fishy smell and were found to be closely resembling to yoghurt products available in the market.

EXAMPLE 29

Frozen "Otoshimi" was thawed and minced with a meat-chopper. 3.0 grams of table salt and 0.2 grams of disodium phosphate were added to 100 grams of the sample, which was well kneaded in a kneader to yield paste like substance.

Proteolytic enzymes, PANCREATIN (Difco) and 0.01 gram of PAPAIN (Ebiosu Pharm.) and 50 ppm Lysozyme as anti-bacteria reagent, each dissolved in small amount of water, were added to the above mixture. Upon adding, the mixture was kept kneaded in the kneader for 30 minutes at 50° C. heated by hot water flowing through the jacket of the kneader and then cooled to 10° C. by replacing with cold water. When the temperature of the mixture reached 10° C., it was packed in a container, which in turn was held at 10° C. for 96 hours to produce protein food materials in paste state.

100 grams of such protein food materials were placed in a breaker, added 10 grams of skim milk powder and kneaded, further added 100 grams water and sufficiently mixed with a homomixer to yield homogeneous solution and sterilized at 100° C. for 30 minutes. Then it was cooled to 40° C. and fermented at 37° C. for 48 hours with 6 grams of the starter which had been cultured beforehand with lactobacilli, *Lactobacillus bulgaicus* and *Streptococcus cremoris*. Then the product was added 0.1 gram of citric acid and stirred hard with homomixer and while resultant curds coagulated being dispersed mechanically, added 320 grams of sugar and heated to 80° C. with slow mixing and as soon as the sugar was melted, the mixture was sterilized by heat for 20 minutes.

Immediately after the sterilization, it was filtered, cooled, added small amount of vanilla essence, and placed in bottles to obtain products desired in this invention.

When tasted with ice and water to dilute, it was neither bitter in taste nor rough in mouth-feel, nor fishy in smell and was found almost same as soured milk drinks available in the market with the same pleasant sourness.

EXAMPLE 30

Frozen "Otoshimi" of Pollocks was thawed and minced with a meatchipper. 3.0 grams of salt and 0.2 gram disodium phosphate were added to 100 grams of the sample which was well kneaded in a kneader to yield paste like substance. 20 grams of skim milk powder was added thereto, which was in turn mixed well to make it homogeneous to obtain protein food materials in paste following the processes described in the EXAMPLE 29.

100 grams of such protein paste was added with 100 grams of water and 0.3 gram powdered agaragar and mixed well with a homomixer to make solution and heated to 50° C., added 20 grams sugar, and melted, sterilized at 100° C. for 30 minutes, and cooled to 40° C.

To the mixture thus obtained, 2 grams each of the starter of *Lactobacillus bulgaricus* and *Streptococcus thermophilis*, both cultivated beforehand, were added, mixed, packed in yoghurt bottles, capped with paper caps, fermented in a thermostat at 37° C. for 6 hours to coagulate, and held in a freezer at 5° C. for cooling to obtain the product desired in the present invention.

This product was almost same as various yoghurt products available in the market with smooth texture with hardly traceable fishy odor or bitter taste.

EXAMPLE 31

Frozen Pollock "Otoshimi" was thawed and minced with a meat-chopper. 100 grams of minced "Otoshimi" was added with 2.5 grams of salt and 0.2 gram of sodium pyrophosphate and kneaded in a kneader to yield paste substance. To such paste, 30 grams of vegetable protein substance "PROTON M" (Nihon Tanpaku) were added, thereto and kneaded to produce a homogeneous mixture. To this mixture, proteolytic enzymes, 0.1 gram of PROTEINASE "AMANO A" (Amano Pharm.) and 0.1 gram PAPAIN (EBIOS Pharm.) and 70 ppm Lysozyme as anti-bacteria reagent, each solved in small amount of water, were added and mixed and finally to obtain protein food materials in paste by following the processes stated in the EXAMPLE 28.

50 grams of such paste protein food materials were placed in a beaker, added 10 grams of skim milk powder and 0.3 gram powdered agar-agar, mixed, further added 250 grams water, and mixed with a homomixer to yield homogeneous solution. Thereafter by following the processes mentioned in the EXAMPLE 29, the product desired in the present invention was obtained.

This product was neither fishy in smell nor bitter in taste and was found to be same as soured milk products available in the market.

EXAMPLE 32

Frozen Pollock "Otoshimi" was processed according to the processing method stated in the EXAMPLE 29 to produce "Otoshimi" paste substance. Thereto, 5 grams of casein and 5 grams of butter were added and kneaded sufficiently in the kneader at high speed.

To this mixture, added 30 grams of culture solution of 10% skim milk powder solution cultivated with lactobacilli, *Lactobacillus casei, Streptococcus lactis,* and *Streptococcus cremoris* beforehand, and mixed while stirring for 30 minutes. Upon completion, the mixture was placed into a container and held at 15° C. for 144 hours to produce protein food materials in paste.

140 grams of such protein food materials were added 10 grams of skim milk powder and 0.2 gram agar-agar, mixed while stirring and then added 250 grams water to yield homogeneous solution. With such solution by following the production steps stated in the EXAMPLE 28, the product designed in the invention was obtained.

This product was neither fishy in smell nor bitter in taste and smooth in texture and was found to be same as yoghurt products available in the market.

EXAMPLE 33

Frozen Pollock "Otoshimi" was processed by following the production method shown in the EXAMPLE 29 to product "Otoshimi" in paste. To such paste substance, 20 grams of wheat starch was added and fully mixed while stirring in a kneader at high speed to obtain homogeneous mixture. To such mixture, 0.1 gram of proteolytic enzyme, Pancreatin (man. DIFCO) dissolved in small amount of water was added and further 20 ml of culture solution of 10% skim milk powder solution cultivated by lactobacilli, *Lactobacillus casei, Streptococcus lactis, Streptococcus cremoris* were added and then well kneaded for 30 minutes. Upon completion, the substance was placed in a container and held at 10° C. for 120 days to obtain protein food product in paste.

140 grams of this paste protein food materials was placed into a beaker, added 10 grams of skim milk powder, well mixed, further added 300 ml water, and again kneaded to produce homogeneous solution.

This solution was processed by following the production method disclosed in the EXAMPLE 29 to produce the product designed in the present invention.

This product was neither fishy in smell nor bitter in taste and was found to be satisfactory in mouth-feel closely resembling to soured milk products avaialable in the market.

What is claimed is:

1. A method for preparing pasty protein food products or pasty protein food materials, which comprises:
   grinding protein starting material selected from the group consisting of fish meat, fish meat in mixture with animal protein, fish meat in mixture with vegetable protein and fish meat in mixture with animal protein and vegetable protein; and
   treating said starting material with a melting agent selected from the group consisting of sodium phosphate, sodium polyphosphate, disodium phosphate, sodium pyrophosphate and sodium tripolyphosphate and with proteolytic enzymes and/or protein digesting microorganisms during and/or after grinding to change the properties of the protein contained in said starting material, reduce or eliminate the gel forming ability of the protein contained in said starting material, and form a paste having a measurable gel strength, wherein the ratio of the water-soluble protein to the total protein is 5 to 50% when only fish meat is used as said starting material and 5 to 60% when animal and/or vegetable protein sources are additionally used as said starting material.

2. The method for preparing pasty protein food products or pasty protein food materials according to claim 1, wherein the vegetable protein source is added to the fish meat before and/or during grinding and or treating.

3. The method for preparing pasty protein food products or pasty protein food materials according to claim 1, wherein the animal protein source other than fish meat is added to the fish meat before and/or during grinding and/or treating.

4. The method for preparing pasty protein food products or pasty protein food materials according to claim 1, wherein at least one member selected from the group consisting of vegetable fat, vegetable oil, animal fat and animal oil sources is added to the starting material before and/or during grinding and/or treating.

5. The method for preparing pasty protein food products or pasty protein food materials according to claim 1, wherein a carbohydrate source is added to the fish meat before and/or during grinding and/or treating.

6. A method for preparing resilient and gel type protein food products, which comprises adding water to the pasty protein food material obtained by the method according to claim 1, heating and then cooling the mixture.

7. A method for preparing fluid or liquid protein food products which comprises adding water to the pasty protein food material obtained by the method according to claim 1 to form a liquefied mixture, sterilizing the mixture and then subjecting the mixture to lactic acid fermentation with lactobacilli.

8. The method for preparing solid or spreadable protein food products according to claim 1, wherein the gel strength of the paste is in the range of 3-70 $g/cm^2$.

9. The product prepared by the process of claim 1.

10. A method for preparing solid or spreadable protein food products, which comprises:
    grinding protein starting material selected from the group consisting of fish meat, fish meat in mixture with animal protein, fish meat in mixture with vegetable protein and fish meat in mixture with animal protein and vegetable protein; and
    treating said starting material with at least one melting agent selected from the group consisting of sodium phosphate sodium polyphosphate, disodium phosphate, sodium pyrophosphate and sodium tripolyphosphate and with proteolytic enzymes and/or protein digesting micro-organisms during and/or after grinding to change the properties of the protein contained in said starting material, reduce or eliminate the gel forming ability of the protein contained in said starting material, and form a paste having a measurable gel strength, wherein the ratio of the water-soluble protein is 5 to 50% when only fish meat is used as the starting material and 5 to 60% when animal and/or vegetable sources are additionally used as the starting material;
    agitating the resulting mixture while heating at 50° to 100° C. to homogenize the mixture; and
    cooling the mixture.

11. The method for preparing solid or spreadable protein food products according to claim 10, wherein a vegetable protein source is added to the fish meat before and or during grinding and/or treating.

12. The method for preparing solid or spreadable protein food products according to claim 10, wherein the animal protein source other than fish meat is added to the starting material before and/or during grinding and/or treating.

13. The method for preparing solid or spreadable protein food products according to claim 10, wherein at least one member selected from the group consisting of animal fat, animal oil, vegetable fat and vegetable oil sources is also added to the fish meat before grinding or during grinding or during treating.

14. The method for preparing solid or spreadable protein food products according to claim 10, wherein a carbohydrate is added to the fish meat before and/or during grinding and/or treating.

15. The method for preparing solid or spreadable protein food products according to claim 10, wherein the gel strength of the paste is in the range of 3-70 $g/cm^2$.

16. The product prepared by the process of claim 10.

* * * * *